3,023,196
POLYMERIZATION OF PERFLUOROOLEFIN MIXTURES
Manville Isager Bro, Wilmington, Del., assignor to E. I. du Pont de Nemours and Company, Wilmington, Del., a corporation of Delaware
No Drawing. Filed Dec. 29, 1958, Ser. No. 783,196
5 Claims. (Cl. 260—87.5)

This invention relates to a new process for preparing perfluorocarbon copolymers by polymerizing mixtures of perfluoroolefins, and more particularly mixtures of monoperfluoroolefins of 2 to 9 carbon atoms having a terminal perfluoromethylene group which mixtures contain 5 to 50 weight percent of tetrafluoroethylene (TFE).

The polymerization of mixtures containing TFE and other organic compounds having terminal ethylenic unsaturation is exemplified in Hanford et al. U.S. Patent 2,468,664, issued April 26, 1949. The polymerization of mixtures containing TFE and hexafluoropropylene is exemplified in Sauer 2,549,935, issued April 24, 1951. The procedures heretofore known for polymerizing mixtures of perfluoroolefins have, however, been characterized by slow reaction rates, particularly as applied to mixtures containing 5 to 50 weight percent of TFE.

It is a general object of the present invention to provide a new process for the polymerization of mixtures of perfluoroolefins having 2 to 9 carbon atoms and a terminal perfluoroethylene group, which mixtures contain from about 5 to 50 weight percent tetrafluoroethylene. A further object is to provide a process for polymerizing such mixtures at a rapid rate. A more particular object is to provide a process for the preparation of resinous perfluorocarbon interpolymers by polymerizing such perfluoroolefin mixtures at a rapid rate. Other objects will be apparent hereinafter.

According to the present invention, it has been found that the aforesaid objects are achieved by a process which comprises subjecting such mixtures to a temperature of at least 150° C. in the presence of an initiator of the general formula $[X(CF_2)_nYS]_2Z$, where X is hydrogen or halogen; Y is a single bond or methylene, Z is a single bond or mercury, and $n$ is 1 to 12. In preferred embodiments, wherein the pressure is at least 200 atmospheres, the reaction proceeds at rates which are controllable, yet markedly faster than those hitherto achieved. In especially preferred embodiments, wherein the initiator concentration is in the range of 0.1 to 1 weight percent, based on the monomers charged, resinous perfluorocarbon copolymers are rapidly produced. Bis(trifluoromethyl)-disulfide and bis(trifluoromethylthio)mercury are especially preferred for the preparation of high molecular weight resinous perfluorocarbon interpolymers.

The process of the invention is applicable to mixtures of monoperfluoro-1-olefins of 2 to 9 carbon atoms which mixtures contain from about 5 to about 50 weight percent TFE. Mixtures containing less than about 5 weight percent TFE are relatively unreactive, and mixtures containing more than about 50 weight percent TFE tend to react at uncontrolled rates with rupture of carbon to carbon bonds, particularly at elevated pressures. Examples of comonomers copolymerizable with TFE according to the process of the invention include hexafluoropropylene, as well as straight and branched chain perfluoro-1-butenes, perfluoro-1-pentenes, perfluoro-1-hexenes, perfluoro-1-heptenes, perfluoro-1-octenes, and perfluoro-1-nonenes. Both the TFE and the comonomeric perfluoro-1-olefin are preferably carefully purified before use to eliminate water, oxygen, and telomerizable impurities, containing hydrogen or halogen other than fluorine. However, aliphatically saturated completely fluorinated liquids may be and preferably are included with the monomer and initiator in the reaction mixture, to facilitate the absorption and dissipation of the high heat resulting from the polymerization. Examples of liquids suitable for this purpose include perfluorocyclobutane, perfluorohexane, perfluorocyclohexane, perfluorodimethyl cyclohexane and perfluoroheptane. The initiators employed in the process of the present invention may be made by any suitable method, cf. M. S. Raasch U.S. Patent 2,451,411, issued October 12, 1948; E. L. Muetterties U.S. Patent 2,729,663, issued January 3, 1956; P. D. Faurote et al., J. Am. Chem. Soc. 78, 4999 (1956); A. M. Lovelace et al., "Aliphatic Fluorine Compounds," Reinhold Publishing Corp., New York (1958). The amount of initiator used in the process of the present invention may vary widely from trace amounts, e.g. 0.001 percent, based on the weight of monomers charged, to relatively large amounts, e.g. 5 percent or more depending on the characteristics desired in the copolymer. In general, catalyst concentrations above about 2 weight percent result in liquid or semi-liquid products, concentrations of 1 to 2 weight percent result in greases or waxes, and concentrations of less than 1 percent result in resinous products. Bis(perfluoromethyl)disulfide is the preferred initiator.

The reaction may be carried out at temperatures above 150° C., which is the temperature at which the sulfur compounds become catalytically active in the process of the invention. Preferably the temperature does not exceed 400° C., in order to avoid undue blackening of the product obtained. Temperatures in the range of 180 to 350° C. are preferred. In the practice of the invention, spontaneous increases in temperature are often encountered, particularly with mixtures containing relatively high proportions of TFE. Such temperature flashes usually occur when the mixture reaches a temperature in the range of 180 to 220° C. In instances where such flashes occur, cooling may be necessary to hold the reaction within the preferred temperature range. The reaction mixture is preferably maintained at a temperature in the range of 200 to 250° C. for a period of from 30 to 150 minutes to achieve maximum conversions.

The reaction may be carried out at any pressure, but in order to achieve quick reaction, is preferably conducted in a confined space such that upon heating a pressure of at least 200 atmospheres is developed. In instances where spontaneous temperature increase occurs, pressures may rise concurrently as much as 1000 atmospheres. The reaction may thereafter conveniently be continued without further adjustment of pressure. Pressure drop is an indication of the extent of the reaction, and the heating is accordingly ordinarily terminated when the pressure ceases to fall.

The reaction may be carried out in a heated tube of any heat-resistant construction, having for example, ingredient supply means closing one end and a liquid seal closing the other. In preferred aspects, however, the reaction is advantageously conducted in a pressure vessel, provided with a rupturable outlet closure adapted to yield before the bursting strength of the vessel proper is exceeded. Such vessels are preferably constructed or lined with acid-resistant metals such as platinum, silver, lead, or stainless steel to avoid metallic contamination of the products.

The invention is more particularly described and explained by means of the following examples, submitted to illustrate but not to limit the invention. In the examples all parts are by weigh except as otherwise indicated. The term "specific melt viscosity" as used herein refers to the apparent melt viscosity as measured at 380° C. under a shear stress of 6.5 pounds per square inch. The term "specific I.R. ratio" as used herein refers to the quotient of the absorbance of light at a wave length of 10.18 microns divided by the absorbance of light at a wave length of 4.25 microns of a film of 2 mil thickness prepared by compression molding a sample of product at 350° C. and quench cooling the molten molding in ice water. Indications from material balances and controlled decomposition studies are that the specific I.R. ratio, multiplied by 4.5, is equal to the weight percent of combined hexafluoropropylene in a TFE/hexafluoropropylene copolymer. The term "MIT flex life" as used herein refers to the number of flexes through an angle of 300° at 23° C. under a tension of 1500 pounds per square inch that are withstood without failure by 5 mil thick film of polymer, prepared by shaping the product in the molten state, as measured on a Tinius-Olson folding endurance tester of the type developed at the Massachusetts Institute of Technology.

*Example I*

A stainless steel tube of about 85 parts water capacity is flushed with nitrogen, evacuated, and charged with about 40 parts of perfluorodimethylcyclohexane, 15 parts of hexafluoropropylene, 15 parts of tetrafluoroethylene, and 0.2 part of bis(trifluoromethylthio) mercury. The vessel is sealed and heated to 200° C., at which temperature the pressure is about 300 atmospheres. At this point the temperature spontaneously increases to about 250° C. and the pressure to about 350 atmospheres. The tube is then cooled to 200° C., at which temperature the pressure is 150 atmospheres. The temperature of the tube is then raised in steps of about 25° C., the temperature being held for about 20 minutes at each step, to a peak temperature of about 325° C. Upon cooling and discharging the tube and evaporating off the liquid component there is obtained 8 parts of dark grey solid polymer, having a specific melt viscosity of $2.34 \times 10^5$ poises, an MIT flex life of 9096 cycles, and a specific I.R. ratio of 5.15. A strip of film molded from a sample of the product is somewhat elastic.

*Example II*

A stainless steel tube of about 85 parts water capacity is flushed with nitrogen, evacuated, and charged with about 40 parts of perfluorodimethylcyclohexane, 30 parts of hexafluoropropylene, 5 parts of tetrafluoroethylene, and 0.2 part of bis(perfluoromethylthio) mercury. The vessel is sealed and heated to 180° C., at which point the temperature rises spontaneously to 205° C. and the pressure to 325 atm. The tube is then maintained at 190–205° C. for 2 hours, during which time the pressure decreases to 150 atm. Upon cooling and discharging the tube there is obtained 1.2 parts of solid polymer, having a specific I.R. ratio of 2.43.

*Example III*

A stainless steel tube of about 85 parts water capacity is flushed with nitrogen, evacuated, and charged with about 40 parts of perfluorodimethylcyclohexane, 30 parts of hexafluoropropylene, 5 parts of tetrafluoroethylene, and 0.2 part of bis(perfluoromethylthio) mercury. The vessel is sealed and heated to 190° C. at which point the temperature rises spontaneously to 250° C. Simultaneously, the pressure rises to 325 atmospheres and then decreases to 250 atmospheres. Upon cooling and discharging the tube and evaporating off the liquid component there is obtained 2 parts of solid polymer having a specific melt viscosity of $3.1 \times 10^6$ poises, an MIT flex life of 770,000 cycles, and a specific I.R. ratio of 2.73.

*Example IV*

A stainless steel tube of about 85 parts water capacity is flushed with nitrogen, evacuated, and charged with about 40 parts of perfluorodimethylcyclohexane, 15 parts of hexafluoropropylene, 15 parts of tetrafluoroethylene and 0.2 part of bis(perfluoromethyl)disulfide. The charge is heated to a temperature of 150° C., at which point the temperature rises spontaneously to 300° C. during 5 minutes while the pressure simultaneously increases to 450 atm. The charge is then cooled to and maintained at about 210° C. for 80 minutes at the end of which time the pressure is 225 atm. Upon cooling and discharging the tube and evaporating off the liquid component at reduced pressure there is obtained 11 parts of solid polymer having a specific melt viscosity of $1.5 \times 10^3$ poises, and a specific I.R ratio of 5.47.

*Example V*

A stainless steel tube of 85 parts water capacity is flushed with nitrogen, evacuated, and charged with about 40 parts of perfluorodimethylcyclohexane, thirty parts of hexafluoropropylene, 10 parts of tetrafluoroethylene and 0.1 part of bis(perfluoromethyl) disulfied. The tube is closed and the charge heated to a temperature of 175° C., at which point the temperature rises spontaneously to 200° C. and the pressure to 550 atm. during an interval of 2 minutes. The charge is thereafter maintained at 150–210° C. for 100 minutes at the end of which time the pressure is 350 atm. Upon cooling and discharging the tube and evaporating off the liquid component there is obtained 6 parts of polymer having a specific melt viscosity of $8.8 \times 10^6$ poises, an MIT flex life of greater than 980,000 cycles, and a specific I.R. ratio of 3.10.

*Example VI*

A stainless steel tube of 85 parts water capacity is flushed with nitrogen, evaporated, and charged with about 40 parts of perfluorodimethylcyclohexane, 30 parts of hexafluoropropylene, 10 parts of tetrafluoroethylene, and 0.2 part of bis(perfluoromethyl) disulfide. The tube is closed and the charge heated to 200° C. at which point the temperature rises spontaneously to 240° C. and the pressure 425 atmospheres during a period of about 3 minutes. The charge is then maintained at a temperature of 200-240° C. for 120 minutes at the end of which time the pressure is 225 atm. Upon cooling and discharging the tube and evaporating off the liquid component there is obtained 6.3 parts of polymer having a specific melt viscosity of $2.5 \times 10^6$ poises, an MIT flex life of more than 195,000 cycles, and a specific I.R. ratio of 4.18.

*Example VIII*

A stainless steel tube of about 85 parts water capacity is flushed with nitrogen, evacuated, and charged with about 40 parts of perfluorodimethylcyclohexane, 30 parts of hexafluoroethylene, 10 parts of tetrafluoroethylene, and 0.4 part of bis(trifluoromethyl) disulfide. The tube is closed, heated to 200° C., and held at 200 to 210° C. for about 140 minutes. The pressure rises initially to about 375 atm. and decreases to about 300 atm. during the 140 minutes. Upon cooling and discharging the tube and evaporating off the liquid component there is obtained 1.8 parts of solid polymer having a specific melt viscosity of $5.1 \times 10^5$ poises and a specific I.R. ratio of 3.57.

*Example VIII*

The procedure of Example VII is duplicated, except that upon initial heating, the temperature of the charge is observed to rise spontaneously from about 200° C. to 270° C. during one minute. The pressure rises to 500 atmospheres and decreases during 120 minutes thereafter, while maintained at 200 to 206° C., to 225 atm. Upon cooling and discharging the tube there is obtained 6 parts of solid polymer having a specific melt viscosity of $1.58 \times 10^5$ poises, an MIT flex life of 5,541 cycles, and a specific I.R. ratio of 5.28.

*Example IX*

Into a nitrogen flushed, evacuated stainless steel tube of 85 parts water capacity is charged 45 parts of hexafluoropropylene, 25 parts of tetrafluoroethylene, 0.2 part of bis(perfluoromethyl) disulfide, and 0.5 part of a solid polymer, prepared by heating 60 parts of hexafluoropropylene and 15 parts of tetrafluoroethylene in the presence of 0.15 parts of bis(perfluorobutyryl) peroxide perfluorobutyl peroxide in a stainless steel tube of 325 parts water capacity for 3 hours at a temperature of 32 to 105° C. The tube is closed and heated to a temperature of 175° C. at which point the temperature rises spontaneously to 280° C. and the pressure increases to 950 atmospheres. Thereafter the tube is maintained at 175–280° C. for 2 hours, at the end of which time the pressure is 375 atm. Upon cooling and discharging the tube, there is obtained 6 parts of solid polymer having a specific melt viscosity of $5.5 \times 10^3$ poises, and a specific I.R. ratio of 8.3. A film molded from the product elongates under a tensile stress of less than 1500 pounds per square inch.

*Example X*

Into a nitrogen flushed, evacuated stainless steel tube of 85 parts water capacity is charged about 25 parts of perfluorodimethylcyclohexane, 20 parts of perfluoroheptene-1, boiling at 80–82° C. and obtained by fractionally distilling products of the pyrolysis, at 200–250° C., of the sodium salt of a commercial mixture of straight and branched chain perfluorooctanoic acids, 15 parts of tetrafluoroethylene and 0.1 part of bis(perfluorodimethyl) disulfide. The tube is closed and heated to 160° C. at which point the temperature rises spontaneously to 330° C. and the pressure increases to 800 atm. and thereafter decreases to 300 atm. during about 3 minutes. Upon cooling and discharging the tube and evaporating off the component liquid there is obtained 10 parts of solid polymer which melts to a fluid grease having a specific melt viscosity of less than $1 \times 10^3$ poises. Infrared analysis of a cast film of the product indicates the presence of chain branching.

*Example XI*

Into a nitrogen flushed evacuated stainless steel tube of 320 parts water capacity is charged 67 parts of perfluorodimethylcyclobutane, 100 parts of hexafluoropropylene, 25 parts of tetrafluoroethylene and 0.43 part of bis(1,1,5-tri-H-octafluoropentyl) disulfide, $[H(CF_2)_4CH_2S]_2$. The vessel is sealed and heated to 200° C., at which temperature the pressure is about 200 atm. The temperature is maintained at 200° C. for 5 hours at autogenous pressure. Upon cooling and discharging the vessel there is obtained 2.5 parts of solid polymer having a melting point in the range of 225 to 240° C.

*Example XII*

Into a nitrogen flushedf evacuated stainless steel vessel of 320 parts water capacity is charged 84 parts of perfluorodimethylcyclobutane, 100 parts of hexafluoropropylene, and 30 parts of tetrafluoroethylene, and 0.34 parts of bis(2-chloro-tetrafluoroethyl) disulfide, $$[Cl(CF_2)_2S]_2$$ 

The vessel is sealed and heated to 170° C., at which temperature the pressure is about 200 atm. The temperature is maintained at 170 C. and autogenous pressure for 5 hours. Upon cooling and discharging the vessel there is obtained 3.6 parts of solid polymer having a melting point in the range of 245–255° C.

I claim:

1. A process for the preparation of perfluoroolefin copolymers which comprises subjecting tetrafluoroethylene together with from 1 to 19 times its weight of another perfluoromonoolefin of 3 to 9 carbon atoms inclusive and having a terminal perfluoromethylene group, to a temperature of at least 150° C. in contact with an initiator of the general formula $[X(CF_2)_n]_2Z$, wherein X is selected from the group consisting of hydrogen and fluorine, Z is a divalent radical selected from the group consisting of —S—S— and —S—Hg—S—, and $n$ is a whole number from 1 to 12 inclusive.

2. A process for the preparation of perfluoroolefin copolyomers which comprises subjecting to a temperature of from 150 to 400° C. and a pressure of at least 200 atmospheres tetrafluoroethylene together with from 1 to 19 times its weight of another perfluoromonoolefin, of 3 to 9 carbon atoms inclusive and having a terminal perfluoromethylene group, in contact with from 0.001 to 5 percent, based on the total weight of said tetrafluoroethylene plus other perfluoroolefin, of bis(perfluoromethyl) disulfide.

3. A process for the preparation of perfluoroolefin copolymers which comprises subjecting to a temperature of 150 to 400° C. and a pressure of 200 to 1000 atmospheres tetrafluoroethylene together with from 1 to 19 times its weight of another perfluoromonoolefin, of 3 to 9 carbon atoms inclusive and having a terminal perfluoromethyl group, and a normally liquid aliphatically saturated perfluorocarbon, in contact with from 0.001 to 5 percent, based on the total weight of said tetrafluoroethylene plus other perfluoroolefin, of bis(perfluoromethyl) disulfide.

4. A process for the preparation of a perfluoroolefin copolymer which comprises subjecting to a temperature of 150 to 400° C. and a pressure of 200 to 1000 atmospheres tetrafluoroethylene together with from 1 to 19 times its weight of another perfluoromonoolefin of 3 to 9 carbon atoms inclusive and having a terminal perfluoromethylene group, and a normally liquid aliphatically saturated perfluorocarbon in contact with from 0.01 to 1 percent, based on the total weight of said tetrafluoroethylene plus other perfluoroolefin, of bis(perfluoromethyl) disulfide.

5. A process for the preparation of a perfluoroolefin copolymer which comprises subjecting to a temperature of from 150 to 400° C. and a pressure of 200 to 1000 atmospheres tetrafluoroethylene, together with from 1 to 19 times its weight of hexafluoropropylene, and a normally liquid aliphatically saturated perfluorocarbon, in contact with from 0.1 to 1 percent, based on the total weight of tetrafluoroethylene plus hexafluoropropylene, of bis(perfluoromethyl) disulfide.

References Cited in the file of this patent

UNITED STATES PATENTS

| | | |
|---|---|---|
| 2,468,664 | Hanford et al. | Apr. 26, 1949 |
| 2,844,614 | Krespan | July 22, 1958 |